(12) United States Patent
Anseth et al.

(10) Patent No.: US 11,656,525 B2
(45) Date of Patent: May 23, 2023

(54) ELECTRO-OPTIC FIBER AND METHODS OF MAKING THE SAME

(71) Applicant: E INK CORPORATION, Billerica, MA (US)

(72) Inventors: Jay William Anseth, Canton, MA (US); Richard J. Paolini, Jr., Framingham, MA (US)

(73) Assignee: E Ink Corporation, Billerica, MA (US)

( * ) Notice: Subject to any disclaimer, the term of this patent is extended or adjusted under 35 U.S.C. 154(b) by 908 days.

(21) Appl. No.: 16/585,218

(22) Filed: Sep. 27, 2019

(65) Prior Publication Data

US 2020/0103720 A1 Apr. 2, 2020

Related U.S. Application Data

(60) Provisional application No. 62/739,684, filed on Oct. 1, 2018.

(51) Int. Cl.
*G02F 1/16757* (2019.01)
*G02F 1/167* (2019.01)
*D01F 8/00* (2006.01)

(52) U.S. Cl.
CPC ............ *G02F 1/16757* (2019.01); *D01F 8/00* (2013.01); *G02F 1/167* (2013.01); *D10B 2401/16* (2013.01); *D10B 2401/20* (2013.01)

(58) Field of Classification Search
CPC .. G02F 1/167; G02F 1/1334; G02F 2201/124; G02F 1/16757; G02F 1/134363; G02F 1/16761; G02F 2201/56; G02F 1/1326; G02F 1/0136; G02F 1/095; G02F 1/13439; G02F 1/1676; G02F 2201/02; G02F 1/01; G02F 1/0115; G02F 1/1333; G02F 1/133305; G02F 1/133348; G02F 1/1675; G02F 1/1677; G02F 2201/06; G02F 2202/022; G02F 2203/12; G02F 2203/48;
(Continued)

(56) References Cited

U.S. PATENT DOCUMENTS 3,852,401 A 12/1974 Suzuki et al.
4,659,619 A 4/1987 Tate
(Continued)

FOREIGN PATENT DOCUMENTS

CN 1807707 A 7/2006
CN 101070672 A 11/2007
(Continued)

OTHER PUBLICATIONS

Korean Intellectual Property Office, PCT/US2019/053388, International Search Report and Written Opinion, dated Jan. 16, 2020.
(Continued)

*Primary Examiner* — Brandi N Thomas
(74) *Attorney, Agent, or Firm* — Brian D. Bean

(57) ABSTRACT

An electro-optic fiber including a conductive fiber, a layer of electro-optic medium on the conductive fiber, and a conductor on the layer of electro-optic medium. A method of making the electro-optic fiber including the steps of coating a conductive fiber with an electro-optic medium and applying a conductor to the electro-optic medium. The resulting fibers can be woven to create a color-changing material, such as a fabric.

17 Claims, 4 Drawing Sheets

(58) Field of Classification Search
CPC ..... D01F 1/04; D01F 8/04; D01F 1/02; D01F 8/00; D01F 1/09; D01F 6/64; G02B 26/026; G02B 6/00; G02B 6/001; G02B 6/036; G02B 6/12; G02B 6/2726; G02B 6/2766; G02B 6/3608

See application file for complete search history.

(56) References Cited

U.S. PATENT DOCUMENTS

| | | | |
|---|---|---|---|
| 4,756,958 A | 7/1988 | Bryant et al. |
| 4,815,355 A | 3/1989 | Cavaness |
| 4,917,920 A | 4/1990 | Ono et al. |
| 5,760,761 A | 6/1998 | Sheridon |
| 5,777,782 A | 7/1998 | Sheridon |
| 5,808,783 A | 9/1998 | Crowley |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,072,619 A | 6/2000 | Kiryuschev et al. |
| 6,097,531 A | 8/2000 | Sheridon |
| 6,120,588 A | 9/2000 | Jacobson |
| 6,120,839 A | 9/2000 | Comiskey et al. |
| 6,128,124 A | 10/2000 | Silverman |
| 6,137,467 A | 10/2000 | Sheridon et al. |
| 6,147,791 A | 11/2000 | Sheridon |
| 6,241,921 B1 | 6/2001 | Jacobson et al. |
| 6,262,706 B1 | 7/2001 | Albert et al. |
| 6,262,833 B1 | 7/2001 | Loxley et al. |
| 6,300,932 B1 | 10/2001 | Albert |
| 6,301,038 B1 | 10/2001 | Fitzmaurice et al. |
| 6,323,989 B1 | 11/2001 | Jacobson et al. |
| 6,377,387 B1 | 4/2002 | Duthaler et al. |
| 6,515,649 B1 | 2/2003 | Albert et al. |
| 6,538,801 B2 | 3/2003 | Jacobson et al. |
| 6,542,284 B2 | 4/2003 | Ogawa |
| 6,580,545 B2 | 6/2003 | Morrison et al. |
| 6,652,075 B2 | 11/2003 | Jacobson |
| 6,693,620 B1 | 2/2004 | Herb et al. |
| 6,721,083 B2 | 4/2004 | Jacobson et al. |
| 6,727,881 B1 | 4/2004 | Albert et al. |
| 6,756,120 B2 | 6/2004 | Smith et al. |
| 6,822,782 B2 | 11/2004 | Honeyman et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,006,063 B2 | 2/2006 | Maeda |
| 7,012,600 B2 | 3/2006 | Zehner et al. |
| 7,012,735 B2 | 3/2006 | Honeyman et al. |
| 7,038,655 B2 | 5/2006 | Herb |
| 7,072,095 B2 | 7/2006 | Liang et al. |
| 7,075,502 B1 | 7/2006 | Drzaic |
| 7,116,318 B2 | 10/2006 | Amundson |
| 7,144,942 B2 | 12/2006 | Zang et al. |
| 7,170,670 B2 | 1/2007 | Webber |
| 7,173,752 B2 | 2/2007 | Doshi et al. |
| 7,180,649 B2 | 2/2007 | Morrison |
| 7,230,750 B2 | 6/2007 | Whitesides |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,247,379 B2 | 7/2007 | Pullen et al. |
| 7,312,784 B2 | 12/2007 | Baucom |
| 7,312,916 B2 | 12/2007 | Pullen et al. |
| 7,321,459 B2 | 1/2008 | Masuda |
| 7,339,715 B2 | 3/2008 | Webber |
| 7,342,068 B2 | 3/2008 | Klingenberg et al. |
| 7,375,875 B2 | 5/2008 | Whitesides et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,453,445 B2 | 11/2008 | Amundson |
| 7,531,235 B2 | 5/2009 | Den Toonder et al. |
| 7,532,388 B2 | 5/2009 | Whitesides et al. |
| 7,535,624 B2 | 5/2009 | Amundson et al. |
| 7,579,078 B2 | 8/2009 | Hartmann et al. |
| 7,679,814 B2 | 3/2010 | Paolini, Jr. et al. |
| 7,715,088 B2 | 5/2010 | Liang et al. |
| 7,746,544 B2 | 6/2010 | Comiskey et al. |
| 7,839,564 B2 | 11/2010 | Whitesides et al. |
| 7,848,006 B2 | 12/2010 | Wilcox et al. |
| 7,903,319 B2 | 3/2011 | Honeyman et al. |
| 3,009,348 A1 | 8/2011 | Zehner et al. |
| 8,018,640 B2 | 9/2011 | Whitesides et al. |
| 8,047,681 B2 | 11/2011 | Howng et al. |
| 8,107,153 B2 | 1/2012 | Sotzing et al. |
| 8,115,729 B2 | 2/2012 | Danner et al. |
| 8,199,395 B2 | 6/2012 | Whitesides et al. |
| 8,207,511 B2 | 6/2012 | Bortz et al. |
| 8,270,064 B2 | 9/2012 | Feick et al. |
| 8,282,232 B2 | 10/2012 | Hsu et al. |
| 8,305,341 B2 | 11/2012 | Arango et al. |
| 8,319,759 B2 | 11/2012 | Jacobson et al. |
| 8,390,918 B2 | 3/2013 | Wilcox et al. |
| 8,446,664 B2 | 5/2013 | Chen et al. |
| 8,582,196 B2 | 11/2013 | Walls et al. |
| 8,593,718 B2 | 11/2013 | Comiskey et al. |
| 8,769,836 B2 | 7/2014 | Donovan et al. |
| 9,244,326 B2 | 1/2016 | Zhou et al. |
| 9,279,906 B2 | 3/2016 | Kang |
| 9,366,935 B2 | 6/2016 | Du et al. |
| 9,372,380 B2 | 6/2016 | Du et al. |
| 9,441,122 B2 | 9/2016 | Zhou et al. |
| 9,478,535 B2 | 10/2016 | Yamazaki et al. |
| 9,529,240 B2 | 12/2016 | Paolini, Jr. et al. |
| 9,633,579 B2 | 4/2017 | McLeod et al. |
| 9,733,541 B2 | 8/2017 | Shuto et al. |
| 9,777,201 B2 | 10/2017 | Widger et al. |
| 9,863,920 B2 | 1/2018 | Gaynor et al. |
| 9,921,451 B2 | 3/2018 | Telfer et al. |
| 10,151,955 B2 | 12/2018 | Paolini, Jr. et al. |
| 10,444,553 B2 | 10/2019 | Laxton |
| 2001/0009352 A1 | 7/2001 | Moore |
| 2003/0194578 A1 | 10/2003 | Tam et al. |
| 2005/0012980 A1 | 1/2005 | Wilcox et al. |
| 2007/0197115 A1 | 8/2007 | Eves et al. |
| 2008/0156657 A1* | 7/2008 | Butterfield ............... B23H 5/08 205/662 |
| 2008/0316580 A1* | 12/2008 | Gillies ............... G02F 1/16757 264/1.7 |
| 2009/0009852 A1 | 1/2009 | Honeyman et al. |
| 2009/0206499 A1 | 8/2009 | Whitesides |
| 2009/0225398 A1 | 9/2009 | Duthaler et al. |
| 2010/0148385 A1 | 6/2010 | Balko et al. |
| 2011/0073353 A1 | 3/2011 | Lee et al. |
| 2012/0274616 A1 | 11/2012 | Scribner et al. |
| 2012/0293858 A1 | 11/2012 | Telfer et al. |
| 2014/0011913 A1 | 1/2014 | Du et al. |
| 2014/0093731 A1 | 4/2014 | Bonfiglio et al. |
| 2015/0005720 A1 | 1/2015 | Zang |
| 2016/0012710 A1 | 1/2016 | Lu et al. |
| 2017/0088758 A1 | 3/2017 | Bzowej et al. |
| 2018/0271180 A1 | 9/2018 | Kim et al. |
| 2018/0363173 A1 | 12/2018 | Keating et al. |
| 2018/0364518 A1 | 12/2018 | Paolini, Jr. et al. |
| 2019/0146299 A1 | 5/2019 | Kaino et al. |
| 2020/0103720 A1 | 4/2020 | Anseth et al. |

FOREIGN PATENT DOCUMENTS

| | | |
|---|---|---|
| CN | 105261423 A | 1/2016 |
| CN | 106705829 A | 5/2017 |
| JP | 2004070206 A | 3/2004 |
| JP | 2010238646 A | 10/2010 |
| KR | 20180013007 A1 | 7/2018 |
| TW | 200916620 A | 4/2009 |

(56) References Cited

FOREIGN PATENT DOCUMENTS

| TW | 201211339 A | 3/2012 |
| TW | M531957 U | 11/2016 |

OTHER PUBLICATIONS

Wood, D., "An Electrochromic Renaissance?" Information Display, 18(3), 24 (Mar. 2002).

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-348, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

European Patent Office, PCT/US2018/036772, International Search Report and Written Opinion, dated Sep. 19, 2018.

\* cited by examiner

ELECTRO-OPTIC FIBER AND METHODS OF MAKING THE SAME

RELATED APPLICATIONS

This application claims priority to U.S. Provisional Patent Application No. 62/739,684, filed Oct. 1, 2018. All patents, published applications, and references disclosed herein are incorporated by reference in their entireties.

BACKGROUND

This invention relates to electro-optic fibers. More specifically, in one aspect this invention relates to thread-like materials having an electrically switchable optical property, such as a color, and methods of making the thread-like materials.

Many types of clothing have been developed. This is due not only to the variety of applications required for the clothing, such as cold-weather or athletics, but also primarily to meet the personal preferences of the consumer with respect to fashion. If modern fabrics were able to change color on demand, for example, a consumer could dramatically reduce the number of articles of clothing that he or she purchased in a lifetime. It would no longer be necessary to have, for example, three different blouses of nearly identical cut but different color. The consumer could simply chose the color (or pattern) needed depending upon the event, season, etc. In this way, color changing fabrics could greatly reduce the environmental impact of clothing. It is estimated that Americans currently discard about 14 million tons of clothing per year into landfills. Additionally, replacing these clothes is resource-intensive regardless of their source, e.g., cotton, wool, or petrochemicals.

Other advantages that may be realized with color changing clothing include adjustable camouflage and sportswear. For example, a baseball team would no longer require two different uniforms, the color could be changed depending upon whether the team was home or away. In another example, the color and/or contrast of camouflage hunting gear may be adjusted by a user depending on the color of the surrounding foliage, the type of season, or the time of day.

A variety of technologies have been identified for creating fabrics that are able to reversibly change colors. These technologies include thermochromic dyes, which change color when exposed to different temperatures, photochromic dyes, which change color when exposed to sunlight, integrated LEDs, which can be illuminated on demand, and liquid crystal inks, which allow different colors to be shown (or not) with the presence of a supplied electric field. These technologies have been highlighted in various prototypes, but only the thermochromic dyes have been widely incorporated into clothing (such as Hypercolor t-shirts sold by Generra Sportswear Company, Inc.). However, because the thermochromic clothing is heat sensitive, the color patterns are variable and, in some cases embarrassing. For example, the underarms may be consistently a different shade when the t-shirt is worn. Also, after prolonged exposure to intense heat in a household dryer the clothing would no longer switch colors.

Accordingly, there is a need for inexpensive and robust fabrics that can change color on demand.

SUMMARY

According to one aspect, an electro-optic fiber may comprise a conductive fiber, a layer of electro-optic medium on the conductive fiber, and a conductor on the layer of electro-optic medium.

According to another aspect, a method of making an electro-optic fiber may comprise coating a conductive fiber with an electro-optic medium and applying a conductor to the electro-optic medium.

These and other aspects of the present invention will be apparent in view of the following description.

BRIEF DESCRIPTION OF THE FIGURES

The Figures depict one or more implementations in accord with the present concepts, by way of example only, not by way of limitations. The drawings are not to scale. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

Generally, various embodiments of the present invention comprise a central conductive fiber or wire that has been coated with an electro-optic medium, preferably, an electrophoretic medium and further comprise second conductor applied to the electro-optic medium, such that the layer of electro-optic medium is between the central conductive fiber and the outer conductor.

The term "electro-optic", as applied to a material, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, or luminescence.

Figure 1:
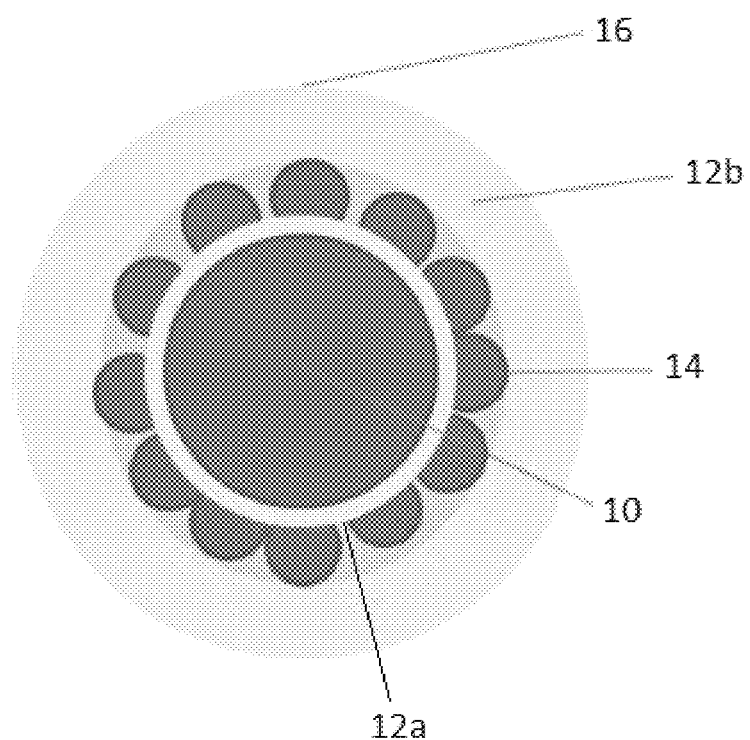
FIG. 1 is a cross-sectional view of an electro-optic fiber according to a first embodiment of the present invention.

Referring now specifically to FIG. 1, a cross-sectional view of an electro-optic fiber according to a first embodiment of the present invention is illustrated. The fiber comprises a central conductive core 10 in the form of a fiber or wire. The central conductive fiber 10 preferably has a large aspect ratio, so that the fiber will remain flexible after having been coated with various layers. For example, the central conductive fiber may have a length greater than or equal to 100 times the thickness of the fiber. Because of this large aspect ratio, the fiber should have sufficient strength to withstand weaving processes. Also, due to the large aspect ratio, the conductivity of the fiber is preferably high to function properly as an electrode to switch the electro-optic medium applied to its surface. For example, any metals, metal alloys, conductive polymers and filaments, or composites containing these materials known in the art having sufficient conductivity may be used in the various embodiments of the present invention. Conductive materials that may be used to form the central conductive fiber include, but are not limited to copper, tungsten, aluminum, nickel, stainless steel, gold, silver, carbon fiber, and combinations thereof. Alloys of the aforementioned conductive metals may also be incorporated in the central conductive fiber. The conductive metal(s) may be plated onto the surface of a core fiber to form the conductive fiber, for example.

The thickness of the central conductive fiber is selected so that a large enough outer surface area is provided to facilitate coating with the electro-optic media, but not too large as to result in a stiff fiber that will be difficult for fabric weaving, as noted above. A larger thickness for the central conductive fiber will also facilitate aggressive cleaning of the fiber in order to expose the wire for electrical connections to a power source and/or controller, for example. Preferably, the central conductive fiber has a thickness greater than or equal to about 20 microns and less than or equal to about 250 microns.

Referring again to FIG. 1, the central conductive fiber 10 is preferably passivated by coating the fiber 10 with at least one dielectric layer 12a, 12b. The dielectric layer 12a, 12b is applied before and/or after the application of a layer of electro-optic media 14. By passivating the fiber 10 wire with a dielectric layer, one can prevent electrical short circuit failure that may occur when over-coating the electro-optic media 14 with another layer of conductive material 16. Gaps in the layer of electro-optic media 14 may result in a short circuit failure; therefore, incorporating additional layers of dielectric material may reduce the likelihood of this occurring.

The dielectric layers 12a, 12b may comprise materials that include, but are not limited to, polyurethane, or 100% solids, UV-curable monomers, such as acrylate products like CN3108 manufactured by Sartomer USA, LLC. The dielectric layers 12a, 12b may be applied, so as to form an annular coating about the outer surface of the conductive fiber 10. The thickness of the annular coating is preferably as thin as possible without pinhole defects, such that the dielectric layer exhibits an electrical resistance of 1e6 to 1e8 Ohms-per-square, for example. The dielectric material is preferably hydrophilic, preferably water insoluble, so that the dielectric layers are not dissolved or removed during application of the electro-optic media, which may be applied as an aqueous slurry.

As noted above, the electro-optic fiber further comprises a layer of electro-optic media 14 over the central conductive fiber 10. The electro-optic media is preferably a solid electro-optic material. Some electro-optic materials are solid in the sense that the materials have solid external surfaces, although the materials may, and often do, have internal liquid- or gas-filled spaces. Thus, the term "solid electro-optic material" may include rotating bichromal members, encapsulated electrophoretic media, and encapsulated liquid crystal media.

Electro-optic media of a rotating bichromal member type are described, for example, in U.S. Pat. Nos. 5,808,783; 5,777,782; 5,760,761; 6,054,071 6,055,091; 6,097,531; 6,128,124; 6,137,467; and 6,147,791 (although this type of media is often referred to as a "rotating bichromal ball," the term "rotating bichromal member" is preferred as more accurate since in some of the patents mentioned above the rotating members are not spherical). Such media uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the material is changed by applying an electric field thereto, thus rotating the bodies to various positions and varying which of the sections of the bodies is seen through a viewing surface. This type of electro-optic medium is typically bistable.

The terms "bistable" and "bistability" are used herein in their conventional meaning in the art to refer to electro-optic materials having first and second states differing in at least one optical property, and such that after the electro-optic material has been driven, by means of an addressing pulse of finite duration, to assume either its first or second state, after the addressing pulse has terminated, that state will persist for at least several times, for example at least four times, the minimum duration of the addressing pulse required to change the state of the electro-optic material. It is shown in U.S. Pat. No. 7,170,670 that some particle-based electrophoretic materials capable of gray scale are stable not only in their extreme black and white states but also in their intermediate gray states, and the same is true of some other types of electro-optic media. This type of media is properly called "multi-stable" rather than bistable, although for convenience the term "bistable" may be used herein to cover both bistable and multi-stable media.

The term "gray state" is used herein in its conventional meaning in the imaging art to refer to a state intermediate two extreme optical states, and does not necessarily imply a black-white transition between these two extreme states. For example, several of the E Ink patents and published applications referred to below describe electrophoretic material in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a material, and should be understood as normally including extreme optical states which are not strictly black and white, for example the aforementioned white and dark blue states. The term "monochrome" may be used hereinafter to denote a drive scheme which only drives electro-optic media to their two extreme optical states with no intervening gray states.

Another type of electro-optic media uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic media may be found in electro-wetting displays developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting media can be made bistable.

One type of electro-optic media, which has been the subject of intense research and development for a number of years, is the particle-based electrophoretic media, in which a plurality of charged particles move through a fluid under the influence of an electric field. Electrophoretic media can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291.

Numerous patents and applications assigned to or in the names of the Massachusetts Institute of Technology (MIT), E Ink Corporation, E Ink California, LLC. and related companies describe various technologies used in encapsulated electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:
(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 7,075,502 and 7,839,564;
(f) Methods for driving displays; see for example U.S. Pat. Nos. 7,012,600 and 7,453,445; and
(g) Applications of displays; see for example U.S. Pat. Nos. 7,312,784 and 8,009,348.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Encapsulated electrophoretic media typically does not suffer from clustering and settling failure and provides further advantages, such as the ability to print or coat the media on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Further, because the medium can be printed (using a variety of methods), an application utilizing the medium can be made inexpensively.

It is preferred that the electro-optic media used in the various embodiments of the present invention is provided in the form of microencapsulated electrophoretic media. For example, referring again to FIG. 1, a layer of microencapsulated electrophoretic media 14 may be coated as an annular coating around the central conductive fiber 10, for example. The annular coating may have a thickness greater than or equal to about 10 microns, preferably about 15 microns, more preferably about 20 microns, and less than or equal to about 250 microns, preferably about 100 microns, more preferably about 75 microns, and most preferably about 50 microns. As noted above, the layer of dielectric material 12a, 12b may be applied under and/or over the layer electrophoretic media 14. The microcapsule coating may be provided, for example, in the form of an aqueous coating slurry formulations comprising a microencapsulated dispersion of electrophoretic particles and a binder. The binder material may include, but is not limited to, an aqueous polymeric latex dispersion or water-soluble polymer solutions (e.g. polyvinyl alcohol, such as Kuraray Poval® CM-318, fish gelatin, and alginate). The slurry formulation may further comprises one or more additives, such as hydropropyl methyl cellulose, surfactants (e.g. Triton X-100), and co-solvents (e.g. butanol).

Following application of the slurry formulation, the layer of electrophoretic media 14 may be dried before the application of an outer light-transmissive layer of conductive material 16. The outer layer of conductive material 16 may be, for example, an annular coating around the layer of electro-optic media 14. The term "light-transmissive" is used herein to mean that the layer thus designated transmits sufficient light to enable an observer, looking through that layer, to observe the change in optical states of the electro-optic medium, which will normally be viewed through the electrically-conductive layer; in cases where the electro-optic medium displays a change in reflectivity at non-visible wavelengths, the term "light-transmissive" should of course be interpreted to refer to transmission of the relevant non-visible wavelengths. Examples of conductive materials include, but are not limited to, metal or metal oxides, such as aluminum or ITO, a conductive polymer, such as PEDOT: PSS, carbon nanotube dispersions, graphene, composite electrodes (e.g. polymeric materials containing metallic nanowires), and combinations thereof.

Figure 2:
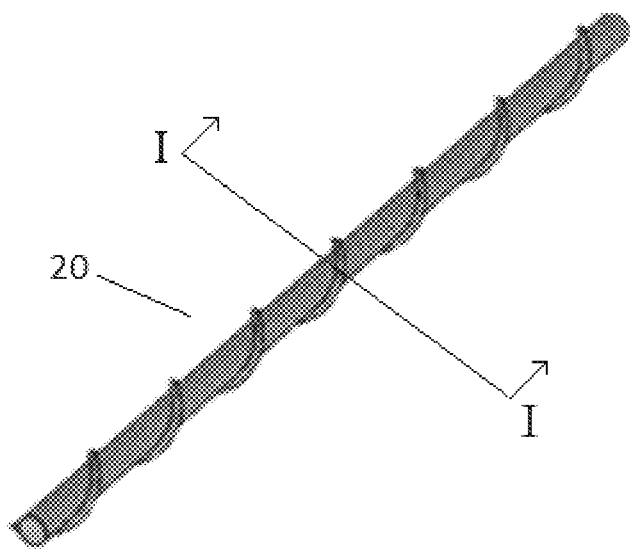
FIG. 2 is a top perspective view of an electro-optic fiber according to a second embodiment of the present invention.
Figure 3:
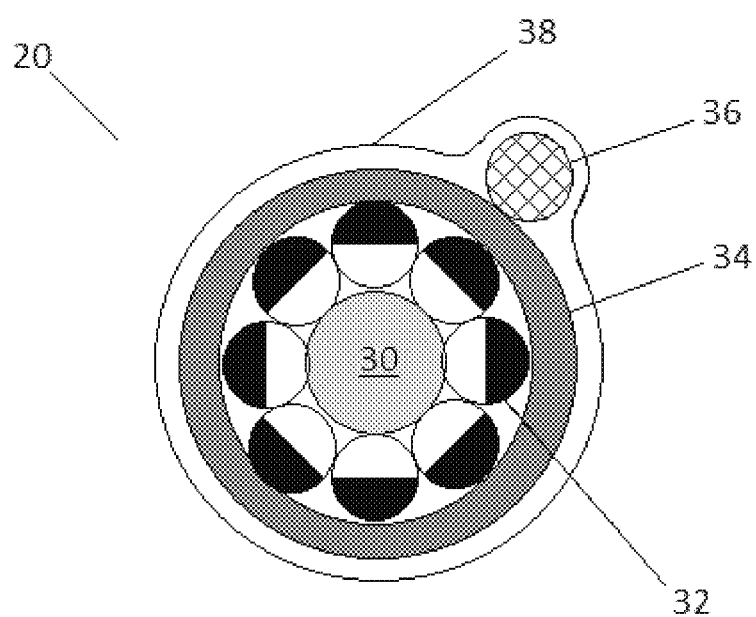
FIG. 3 is a cross-sectional view of the second embodiment illustrated in FIG. 2 along axis I-I.

Referring now to FIGS. 2 and 3, an electro-optic fiber 20 according to another embodiment of the present invention is provided. The electro-optic fiber 20 includes several of the same layers as the fiber made according to the aforementioned first embodiment. For example, the electro-optic fiber 20 includes a similar core comprising a conductive fiber 30 and similar layer of electro-optic material 32 may be coated to the outer surface of the conductive fiber 30. The previously described layers of dielectric material are optional in the second embodiment.

The electro-optic fiber 20 differs from the previously described first embodiment in that the electro-optic fiber 20 may comprise a layer of light-transmissive semi-conductive polymeric material 34 coated onto the layer of electro-optic media 32, as well as a conductive material provided in the form or a conductive wire 36 applied to the outer surface of the layer of semi-conductive polymeric material 34. The conductive wire 36 may be wound in the form of a coil or helix, for example, around the outer surface of the semi-conductive polymeric material 34. In some embodiments, a plurality of wires may be applied to the outer surface of the semi-conductive polymeric material.

The layer of semi-conductive polymeric material 34 may be provided in the form of an annular coating having a thickness from about 5 microns to about 200 microns, preferably to about 50 microns, wherein the thickness is preferably measured between the conductive wire and the electro-optic media. The semi-conductive polymeric material may comprise a doped polymeric material. The composition and thickness of the semi-conductive polymeric material is selected, such that the semi-conductive polymeric material is light-transmissive and the individual wraps of the conductive wire 36 may be spaced apart to not substantially obscure the underlying electro-optic media while still allowing electrical driving signals across the full area between wires. This phenomenon is also known as "blooming" whereby the area of the electro-optic layer which changes optical state in response to a change of voltage is larger than the area of the electrode, in this example, the area of the conductive wire in contact with the semi-conductive polymeric material. The distance between the wraps of the coiled outer conductive wire may be less than 5 mm, more preferably about 1 mm or less, and most preferably about 500 microns or less. The resistivity of the layer of semi-conductive polymeric material is preferably about 10e9 ohm-cm or less, more preferably about 10e7 ohm-cm or less, at 20° C.

Doped polymeric materials that may be used in the layer of semi-conductive polymeric material may include, but are not limited to, aliphatic or aromatic polyurethane latexes, polyacrylates, and poly(meth)acrylates containing a dopant, such as tetrabutylammonium hexafluorophosphate, 1-butyl-3-methylimidazolium hexafluorophosphate, polyvinyl alcohol, ionically modified polyvinyl alcohol, gelatin, polyvinyl pyrrolidone, and combinations thereof. Polymeric blends containing aromatic isocyanates are less preferred. Examples of formulations that may be included in the layer of semi-conductive polymeric material are described in U.S. Patent Application Publication No. 2017/0088758 and U.S. Pat. Nos. 7,012,735; 7,173,752; and 9,777,201.

The conductive wire applied to the surface of the semi-conductive polymeric material is preferably more compliant and has a smaller thickness than the central core wire, so that the outer conductive wire may be wrapped repeatedly around the outer surface of the semi-conductive polymeric material. The outer conductive wire preferably has a thickness of about 10 to about 100 microns and is made of a high conductive material, such as a metal. Therefore, similar to the central conductive core of the electro-optic fiber, the outer conductive wire may be made from a metal, such as copper or tungsten.

Various manufacturing methods may be used to apply the outer conductive wire to the layer of semi-conductive polymeric material. For example, in order to wrap the outer conductive wire around the resistive layer, the wire may be dispensed from a spool which unwinds in a direction generally perpendicular to the central conductive core of the fiber. The fiber may be advanced past the spool, as the spool simultaneously unwinds and orbits about the fiber unwinding the conductive outer wire under light tension with each revolution. Controlling the rotating speed of the unwinding spool and the speed of the advancing fiber will allow control of the frequency of the wraps to ensure proper spacing. The parameters can be adjusted to create multiple different spacing of the wires and multiple wires can be wrapped at the same time by utilizing multiple spools, for example.

Figure 4:
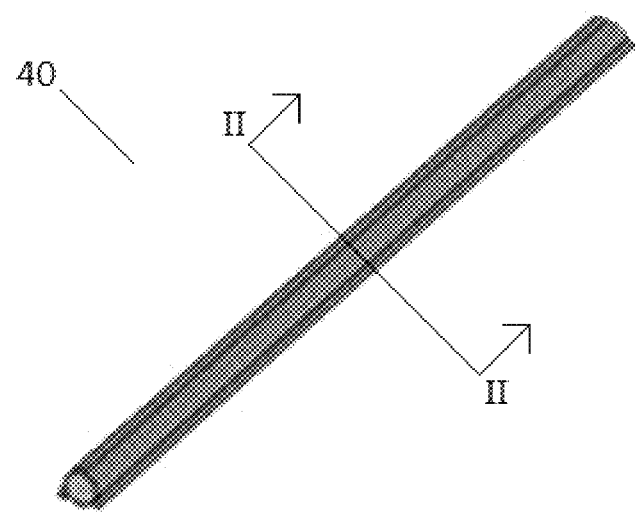
FIG. 4 is a top perspective view of an electro-optic fiber according to a third embodiment of the present invention.

It is preferred that the outer conductive wire penetrates at least partially into the layer of semi-conductive polymeric material, so that at least a portion of the semi-conductive polymeric layer separates the outer conductor from the layer of electro-optic media. For example, in a third embodiment of the present invention illustrated in FIGS. 4 and 5, the electro-optic fiber 40 comprises the same features as the aforementioned second embodiment. The electro-optic fiber 40 may comprise a central conductive core 50, a layer of electro-optic medium 52 applied to outer surface of the core 50, and a layer of light transmissive semi-conductive polymeric material 56 applied to the outer surface of the electro-optic medium 52.

The third embodiment differs from the second embodiment in that a plurality of outer conductive wires 52 are embedded in the outer surface of the layer of light-transmissive semi-conductive polymeric material 56. Rather than being wound about the outer surface, the outer conductive wires 52 have been applied, such that they are substantially parallel to the inner conductive core 50. The outer conductive wire may be added with multiple spools which unwind parallel to the fiber. The fiber may be advanced past the spools and the spools unwind wire under light tension as the fiber is advanced. The spools would not need to rotate around the fiber.

Figure 5:
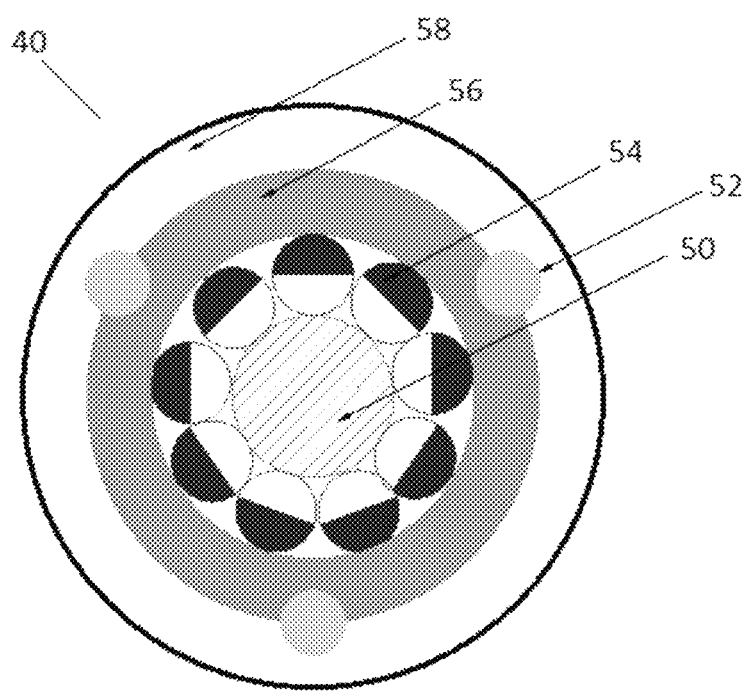
FIG. 5 is a cross-sectional view of the third embodiment illustrated in FIG. 4 along axis II-II.

All of the various embodiments of the present invention may further comprise an outer light-transmissive protective layer, such as layer 38 in FIG. 3 or layer 58 in FIG. 5. The layer of protective material may be configured to serve as a mechanical and environmental protection layer for the underlying materials. The protective materials may comprise a polymeric material, for example, such as polyvinyl alcohol, crosslinked gelatin, acrylates, urethane acrylate co-polymers, and blends thereof. In order to provide a more water-resistant protective layer, the polymeric material may include 100% solids radiation cured hard-coat materials, such as a solvent borne hard coat material like DCU2002 manufactured by PPG Industries Inc., a solvent borne high solids polyurethane automotive clear hard coat material.

The coated layers in the various embodiments of the present invention, such as the layers of dielectric material, electro-optic media, outer conductive material, semi-conductive polymeric material, and protective material, may be applied via a variety of printing methods, such as those noted above, including, but not limited to, dip coating, electrodeposition, powder coating, spray coating, or extrusion.

Figure 6B:
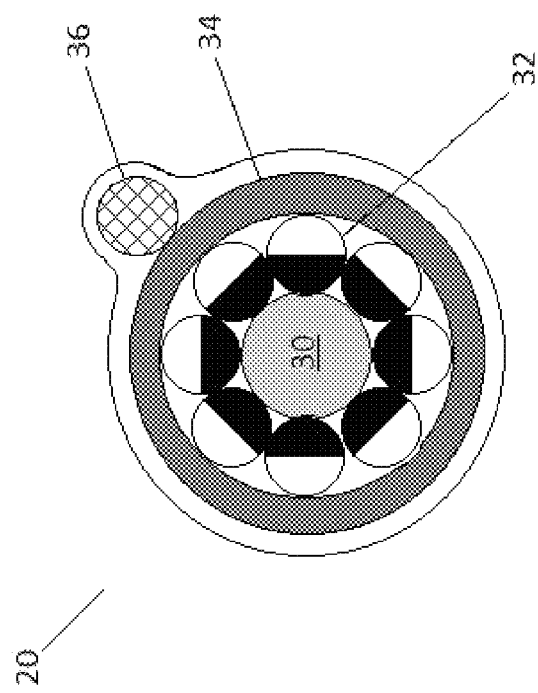
FIG. 6B is the cross-sectional view of the second embodiment illustrated in FIG. 2 in a second optical state.
Figure 6A:
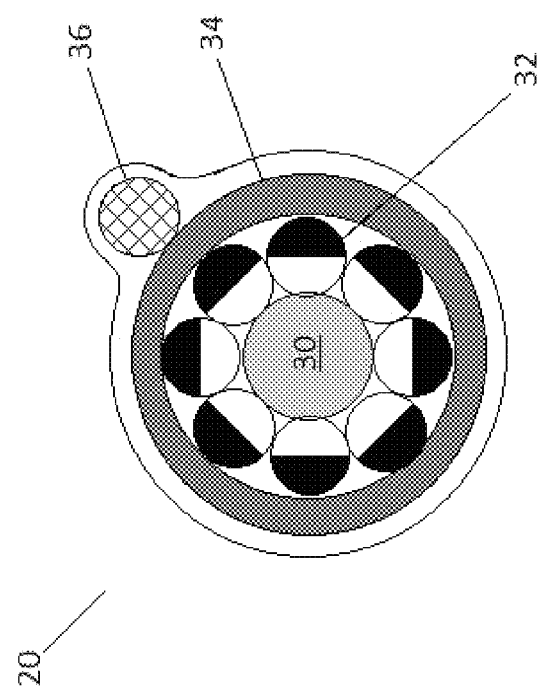
FIG. 6A is the cross-sectional view of the second embodiment illustrated in FIG. 2 in a first optical state.

In order to switch the optical state of the electro-optic medium of the electro-optic fiber, a voltage is applied between the central conductive core and the outer conductor of the fiber. If the electro-optic media comprises an electrophoretic media, the applied electric field causes the electrophoretic particles within the encapsulated dispersion to move either towards or away from the central conductive core. For example, FIGS. 6A and 6B illustrate an electro-optic fiber 20 according to the second embodiment of the present invention in two different optical states. The layer of electro-optic media 32 may be filled with an electrophoretic dispersion containing a white fluid and positively charged black particles, for example. As shown in FIG. 6A, when the voltage applied to the central conductive core fiber 30 and outer conductive wire 36 is such that the central conductive core fiber 30 is positive relative to the outer conductive wire 36, the positively charged black particles will be driven away from the central conductive core fiber 30, i.e. towards the outer circumferential view side of the fiber, resulting in a dark optical state for the fiber 20. When the polarity is reversed, as illustrated in FIG. 6B, the charged black particles are driven towards the central conductive core fiber 30, so that the black particles are obscured by the white dispersion fluid, resulting in a white optical state of the fiber 30.

The various embodiments of the invention allows one to make fabrics that are inherently breathable and flexible by weaving the electro-optic threads. The electro-optic fibers according to the various embodiments of the present invention may be used on standard looms and the manufacturing processes used to produce the fibers are easily scalable. Furthermore, the threads have the potential to be independently addressed, and the electro-optic media applied to each thread may contain different formulations. As a result, fabrics made using the electro-optic fibers described herein may use a plurality of different fibers. For example, one set of fibers may include an encapsulated electrophoretic media containing white and red pigments, a second set may include media containing white and green pigments, and a third set may include white and blue pigments. The fabric may be woven with the three sets of threads, such that the final configuration of the weave would allow the combination of any of the four colors in various switchable proportions and patterns to achieve a wide spectrum of selectable colors for the fabric. The electrophoretic media is not limited to two pigments. The encapsulated electrophoretic media may alternatively include three or more pigments and/or a colored dispersion fluid to allow for a potentially infinite number of optical combinations within the fabric, such as the electrophoretic media disclosed in U.S. Pat. No. 9,921,451. By using bistable electro-optic media, low power is required to switch the material and electronic controls used to switch the material may be detachable.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

All of the contents of the aforementioned patents and applications are incorporated by reference herein in their entireties.

We claim:

1. An electro-optic fiber comprising:
a conductive fiber;
a layer of electro-optic medium on the conductive fiber, wherein the electro-optic medium comprises a binder and a plurality of microcapsules containing a plurality of electrophoretic particles dispersed in a fluid;
a light-transmissive semi-conductive polymeric layer on an outer surface of the electro-optic medium, wherein the light-transmissive semi-conductive polymeric layer comprises a polyacrylate, a poly(meth)acrylate, a polyvinyl alcohol, a gelatin, or a polyvinyl pyrrolidone, and a dopant comprising tetrabutylammonium hexafluorophosphate or 1-butyl-3-methylimidazolium hexafluorophosphate; and
a conductor wherein at least a portion of the light-transmissive semi-conductive polymeric layer is between the conductor and the electro-optic medium.

2. The electro-optic fiber of claim 1, wherein the conductive fiber has a length and a thickness and a ratio of the length to the thickness of the conductive fiber is greater than or equal to 100.

3. The electro-optic fiber of claim 1, wherein the conductive fiber comprises a conductive metal.

4. The electro-optic fiber of claim 1, wherein the conductive fiber has a thickness greater than or equal to 20 microns and less than or equal to 250 microns.

5. The electro-optic fiber of claim 1, wherein the electro-optic medium forms an annular coating about the outer surface of the conductive fiber.

6. The electro-optic fiber of claim 5, wherein the annular coating has a thickness greater than or equal to 10 microns and less than or equal to 250 microns.

7. The electro-optic fiber of claim 1, wherein at least a portion of the light-transmissive semi-conductive polymeric layer is between the conductor and the electro-optic medium.

8. The electro-optic fiber of claim 1, wherein the light-transmissive semi-conductive polymeric layer forms an annular coating about the outer surface of the electro-optic medium.

9. The electro-optic fiber of claim 8, wherein the annular coating has a thickness greater than or equal to 5 microns and less than or equal to 200 microns.

10. The electro-optic fiber of claim 1, wherein the conductor comprises a conductive wire configured as a coil wrapped around the layer of electro-optic medium.

11. The electro-optic fiber of claim 1, further comprising a layer of a light-transmissive protective coating, wherein the layer of electro-optic medium is between the layer of the light-transmissive protective coating and the conductive fiber.

12. The electro-optic fiber of claim 11, wherein the light-transmissive protective coating comprises a material selected from the group consisting of polyvinyl alcohol, gelatin, polyurethane, acrylates, urethane acrylate co-polymers, and blends thereof.

13. The electro-optic fiber of claim 1, wherein the conductor comprises a light-transmissive layer of conductive material.

14. The electro-optic fiber of claim 13, wherein the conductive material is selected from the group consisting of ITO, PEDOT:PSS, carbon nanotubes, graphene, and composite electrodes, and combinations thereof.

15. The electro-optic fiber of claim 13, wherein the light-transmissive conductive material forms an annular coating about the outer surface of the electro-optic medium.

16. The electro-optic fiber of claim 1 further comprising a layer of dielectric material between the conductive fiber and the conductor.

17. The electro-optic fiber of claim 16, wherein the layer of dielectric material forms an annular coating about the outer surface of the conductive fiber.

* * * * *